Patented June 24, 1930

1,765,867

UNITED STATES PATENT OFFICE

HENRY G. GRANGER, OF BUSKIRK, NEW YORK

METHOD FOR MAKING CANDY

No Drawing. Application filed December 15, 1928. Serial No. 326,412.

This improvement relates in general to a food compound and more especially to a candy or the like embracing as a part thereof a medicament, and the method of producing such candy.

The medicinal value of salts containing phosphorus and calcium for tonifying, strengthening and fortifying the human body, and especially as a lime restorer for the human body in the treatment of certain diseases of the bones and teeth is well known. It is also well known that certain foods, more generally classified as confections, such as candy and the like, have a great affinity for the lime properties of the human blood and require the same in order properly to be assimilated in the digestive tract. In line with the foregoing, it is also well established that many of the diseases of the teeth and bones are directly due to robbing the blood of the lime needed for the bones and teeth, by the continued excesive eating of sweets, confections, candy and the like.

In view of the foregoing, the present invention has for a special object to provide a candy having embodied therein a lime restoring element such as calcium carbonate, calcium glycero phosphate and calcium tri-basic phosphate, in the proportion of not less than one part of these salts to ninety-nine parts of the candy compound and not more than three parts of the salts to ninety-seven parts of the candy compound. It has been established that the average diet should contain not less than one part of a calcium containing salt to every ninety-nine parts of food consumed, and it has also been established that if the supply of food consumed contained more than one part of calcium to ninety-nine parts of the food consumed, preferably not to exceed three parts calcium to ninety-seven parts of food consumed, the human body will only absorb the required amount, about one part of calcium, and throw off the excess.

The present invention further aims to provide a candy in which a food product serves as the vehicle or carrier for the medicament, phosphorus and calcium containing readily assimilatable salts, in which form the medicament will be pleasant to take, without at the same time making it necessary for the patient or user to attend to the proportion prescribed. In other words, the amount of medicament will be automatically determined by the amount of solid food products consumed by the patient. It is of course well known to coat with sugar, chocolate and the like various medicaments put up in various forms such as pills. However with such sugar coated pills there is no attempt made automatically to regulate the amount of medicament to be used.

It is a further object of the present invention to provide a food compound composed of a predetermined quantity of a lime and phosphorus forming medicament and a food product such as candy, which draws upon the blood for an excess amount of lime, literally impoverishing the blood of the amount of lime necessary properly to nourish the osseous and dental structures of the human body, whereby the lime forming medicament will automatically replenish the lime extracted from the blood, or supply the lime necessary for assimilating the sugar excess in candy, and thus leave the blood unaffected by the consumption of food products containing an excess of sugar.

The present invention also aims to provide a candy or confection having a surplus of calcium and phosphorus containing salts to offset the modern dietary deficiency in these salts, it being noted that the excess over the requirement of nature would not be absorbed but would pass off without effect.

Excellent results have been obtained with the following proportions substantially:

| | Per cent |
|---|---|
| Glycerophosphate of calcium | 0.05 |
| Calcium carbonate | 1 |
| Calcium tri-basic phosphate | 1 |
| Candy compound | 97.95 |

The present invention still further aims to provide a food compound composed of a food product such as candy and a lime and phosphorus forming salt, in which the salt is imperceptible to the taste thereby to overcome the prejudices of the fastidious or of those to whom the taking of medicine is offensive or unpleasant.

The present invention also aims to produce a food compound composed of a food product such as candy, a lime and phosphorus supplying medicament, an iron supplying medicament and an iodine supplying medicament. To this end it has been found that excellent results have been produced in the following proportions, assuming the resulting compound to weigh two hundred grams: One to three parts calcium-glycero phosphate, calcium carbonate and calcium tri-basic phosphate as compared to one hundred parts of the resulting food compound, a three-tenths part of iron as compared to one hundred parts of the resulting food compound, and one to three drops of iodine as compared to one hundred parts of the resulting food compound.

When making ordinary hard candy such as lemon drops, the medicament, a salt containing calcium such as calcium carbonate and/or salts containing calcium and phosphorus, such as glycerophosphate of calcium and calcium tri-basic phosphate, may be introduced and thoroughly disseminated throughout the candy without in any way affecting the appearance, odor, and taste of the candy, and without in any way causing bubbling, effervescing or any semblance of fermentation so objectionable in the making of translucent hard candy. In the manufacture of translucent hard candy, such as lemon drops, for a small batch, it is customary to place in a container, kettle, and the like about two pounds of corn syrup or invert sugar as a "doctor", about ten pounds of sucrose or common cane sugar, and two quarts of water. Thereupon the same is heated with the usual precautions, having regard as to the condition of the fire and cleanliness of the kettle. When the resulting mass comes to a boil, and has reached a temperature of say 240° F., sufficient opportunity will have been given for the "doctor" to have performed its work, so that no further reaction is initiated by the "doctor" and free water has been driven off. Further heating which is customarily continued up to temperatures of about 300°–335° F. serves to churn and mix and to render homogeneous the entire batch. If, therefore, the salts containing calcium or calcium and phosphorus are introduced at about the temperature of 240° F., no further reaction will be initiated by the "doctor" or the water and the salts will be safe from being acted upon by such agents. The subsequent heating of the batch to a temperature of 300° F. to 335° F. will bring about an intimate and uniform distribution of the many minute portions of the salts throughout the mass, and the salts will be present as such salts, and not as reaction products or residues of reaction products in the finished product. After exposure of the mass to a temperature of 300° F. to 335° F., the mass is poured upon a cooling table at which time the desired coloring matter is customarily introduced, and thereupon when the mass has been sufficiently cooled to a consistency of a thick paste, the flavoring element may be introduced such as, in the present case, powdered citric acid to the amount of one and one-half ounces, and lemon oil to the amount of one-half ounce. Thereupon the mass is further kneaded so that the added ingredients are thoroughly mixed and disseminated throughout. The flavoring element, being aciduous, might react with the salts if introduced before the batch had sufficiently cooled, but as the batch will, on cooling, assume the consistency of a thick paste, in which the salts are occluded within or coated by sticky, sugary material before the flavoring element is introduced, no noticeable reaction can occur.

It is also obvious that by means of the aforesaid food compound even a gluttonous child will not be injured by eating as freely as desired candy containing these salts, and on the contrary will actually be physically improved.

I am aware that it has been proposed heretofore to incorporate various medicaments into food products to supply the body with such minerals as are present in insufficient quantities, perhaps through an improper or unbalanced diet. Thus, iodine has been added to common salt and calcium salts have been incorporated into breads. However, it should be noted that this prior practice of using food products to carry minerals into the body is distinguished from the present invention in two important particulars: There was no problem in adding the minerals to the food carriers, and, secondly, the eating of the food carriers did not cause a further lack of minerals. For example, salt does not withdraw other minerals from the body, and iodine is not added to compensate for any deficiency caused by salt consumption. On the other hand, there is a distinct problem in the introduction of certain minerals into candy. Owing to the presence of water and acids, the activity of the "doctor" and the very high temperatures in the making, it is natural to assume that undesirable chemical reactions would occur upon the addition of minerals to the candy mix and that such reactions would destroy the nature of the candy by changing the taste or smell, or otherwise making it inpalatable. Further, it would be logical to conclude that the chemical reactions would cause a change in the form of the added minerals in such a way as to make the minerals unassimilable by the body and thus the purpose of their addition would be destroyed.

It is also important to observe that the act of eating candy in itself is injurious owing to the withdrawal of necessary minerals. Therefore, mineralized candy carries to the body such minerals as are needed to further the digestion thereof as well as to replenish lacking minerals.

This application constitutes a continuation in part of my copending application, Serial No. 109,365 filed May 15, 1926.

It is obvious that various changes and modifications may be made in the percentages and ingredients above referred to without departing from the general spirit of the invention as set forth in the appended claims.

I claim:

1. The method of making a candy composed of a candy compound and the salts of calcium and phosphorus consisting in mixing the candy compound, heating the same to the temperature of about 240° F., and thereupon introducing salts containing calcium and phosphorus, thereupon heating the resulting mixture to about 300° F., thereupon pouring the resulting mass upon a cooling table, thereupon introducing the coloring matter and the flavoring element, and thereupon kneading the resulting batch to thoroughly mix and disseminate the added ingredients.

2. The method of making a medicated candy which comprises mixing candy ingredients and a doctor such as invert sugar or the like, subjecting the mixture to sufficient heat to cause reaction between the doctor and ingredients, introducing salts of calcium and phosphorus into the mixture after the reaction between the doctor and candy ingredients has ceased, and mixing the resulting mass until the salts have been intimately and uniformly distributed throughout the mass.

HENRY G. GRANGER.